(12) United States Patent
McHugh et al.

(10) Patent No.: US 9,350,763 B1
(45) Date of Patent: May 24, 2016

(54) HTTP TUNNELLING OVER WEBSOCKETS

(75) Inventors: Jason G. McHugh, Seattle, WA (US); Abraham M. Passaglia, Seattle, WA (US); Ravi R. Subramanian, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 536 days.

(21) Appl. No.: 13/449,229

(22) Filed: Apr. 17, 2012

(51) Int. Cl.
*G06F 15/16* (2006.01)
*H04L 29/06* (2006.01)

(52) U.S. Cl.
CPC ........................................ *H04L 65/00* (2013.01)

(58) Field of Classification Search
CPC ............................... H04L 1/00; H04L 2201/00
USPC .......................................................... 709/228
See application file for complete search history.

(56) References Cited

U.S. PATENT DOCUMENTS

| | | | | |
|---|---|---|---|---|
| 7,370,015 | B2 * | 5/2008 | Gvily | 705/42 |
| 7,617,504 | B1 * | 11/2009 | Hill | G06F 9/548 709/213 |
| 8,135,392 | B2 * | 3/2012 | Marcellino et al. | 455/418 |
| 2005/0060427 | A1 * | 3/2005 | Phillips et al. | 709/238 |
| 2006/0077941 | A1 * | 4/2006 | Alagappan et al. | 370/338 |
| 2007/0088849 | A1 * | 4/2007 | Suzuki | H04L 67/34 709/238 |
| 2010/0281107 | A1 * | 11/2010 | Fallows et al. | 709/203 |
| 2010/0306547 | A1 * | 12/2010 | Fallows | G06F 21/305 713/178 |
| 2012/0030746 | A1 * | 2/2012 | Sng et al. | 726/11 |
| 2013/0275585 | A1 * | 10/2013 | Santhanakrishnan | G06F 11/3476 709/224 |
| 2014/0025832 | A1 * | 1/2014 | Ito | H04L 65/1069 709/228 |
| 2014/0156725 | A1 * | 6/2014 | Mandyam | H04L 67/02 709/203 |

OTHER PUBLICATIONS

Fette, I., "RFC 6455: The WebSocket Protocol," Dec. 2011, Internet Engineering Task Force (IETF), pp. 1-71.*

* cited by examiner

*Primary Examiner* — Alicia Baturay
(74) *Attorney, Agent, or Firm* — Polsinelli LLP

(57) ABSTRACT

Conventional messages sent by sources such as applications executing on a computing device can be intercepted by a message converter module, or other such component, and converted to raw data, binary data, or another appropriate format that is able to be sent using a websocket connection. A websocket connection can provide greater efficiencies in at least some situations, and the intercepting of a message independent of, and transparent to, an application or other such component or module enables the websocket connections to be implemented without knowledge of the connections or conversion by applications at either endpoint.

24 Claims, 6 Drawing Sheets

HTTP TUNNELLING OVER WEBSOCKETS

BACKGROUND

Conventional approaches for creating and implementing network-based applications, such as web applications, have been limited in the ways in which those applications can communicate. In order to overcome these limitations, some applications perform operations in ways that were not intended. For example, an application might abuse capabilities of the hypertext transfer protocol (HTTP) to poll a server for updates while sending upstream notifications as distinct HTTP calls. This has created a number of inefficiencies, as such an approach forces servers to use a number of different underlying TCP connections for each client, one for sending information to the client and a new one for each incoming message. The wire protocol for operating this scheme is costly from an overhead perspective, negatively effecting latency and bandwidth. Additionally, maintaining state to correlate multiple client-to-server connections, such as one polling for changes and the other communicating information, is costly from a memory and CPU perspective.

BRIEF DESCRIPTION OF THE DRAWINGS

Various embodiments in accordance with the present disclosure will be described with reference to the drawings, in which.

DETAILED DESCRIPTION

Figure 1:
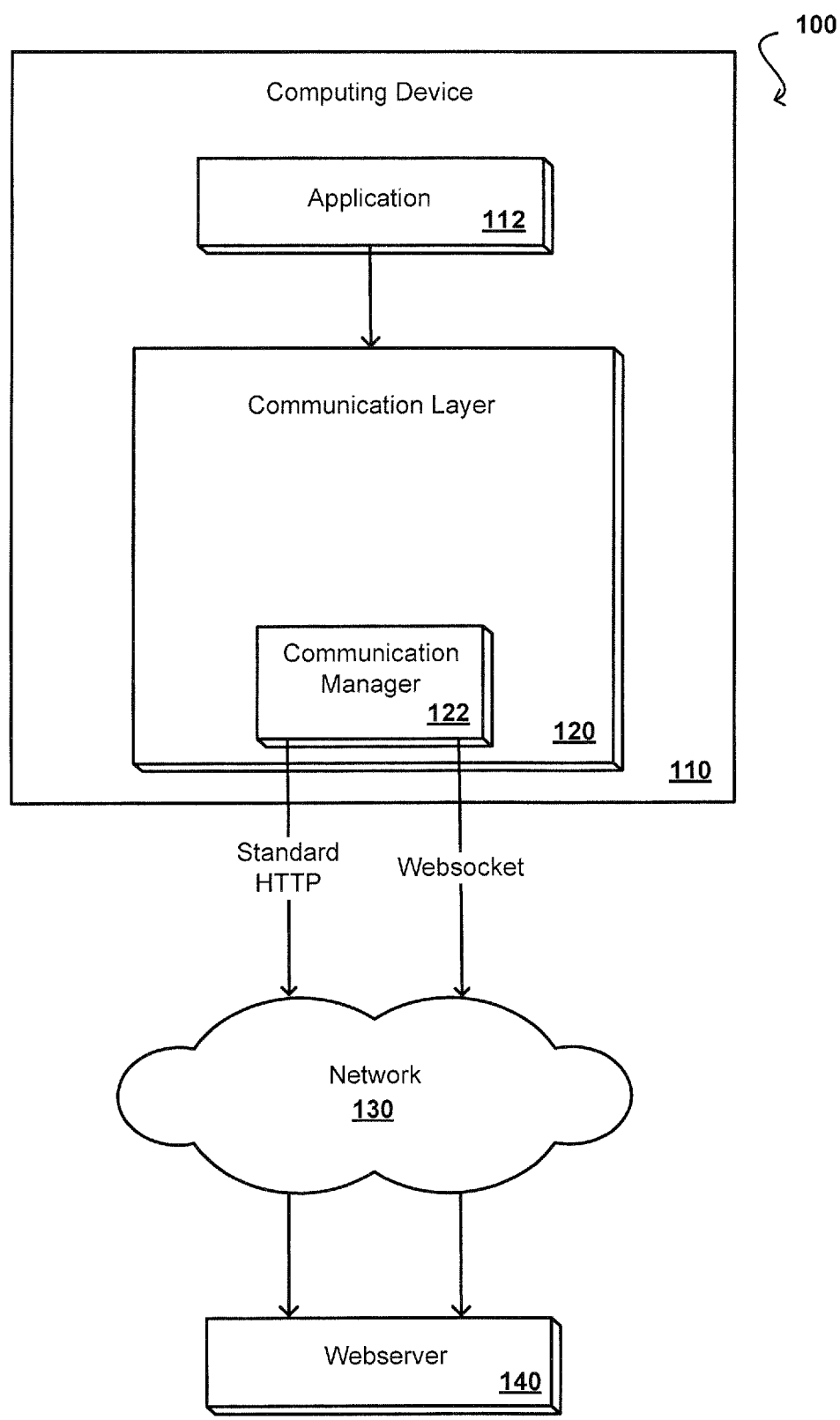
FIG. 1 illustrates an example component level workflow diagram of a communication protocol, in accordance with various embodiments.

Systems and methods in accordance with various embodiments of the present disclosure overcome one or more of the aforementioned and other deficiencies experienced in conventional approaches to providing communications in a networked environment. In particular, various embodiments provide approaches for utilizing a conventional protocol, such as is provided via the Hypertext Transfer Protocol (HTTP) infrastructure, to send conventional requests and responses over websocket connections. An HTTP message, for example, can be intercepted and converted to an appropriate format in a way that is transparent to a sending application, such that the application can send a standard request that can be transmitted over a bidirectional websocket connection without the application having to have any knowledge of the transformation. Similarly, a conversion module on the receiving endpoint can receive the data over the websocket connection and convert the data back to a conventional HTTP response, and forward the HTTP response to an intended destination, which also does not need to be aware of the transformation or configured differently than if the response was transmitted as a conventional HTTP response.

Websocket connections can allow for more efficient communication between endpoints. For example, HTTP was not designed for real-time, full-duplex communication or the transmission of data in two directions simultaneously. WebSocket connections, however, enable full-duplex communication between a client and server. The Websocket protocol, in various configurations, can provide an alternative to HTTP polling for two-way communication, such as from an application or web page to a server. The Websocket Protocol attempts to address shortcomings of existing bidirectional HTTP technologies in the context of the existing HTTP infrastructure (e.g. proxies, filtering, and authentication). Before websockets, one approach enabled a server to send (or push) data to a client without the client having to explicitly request the data. This approach, however, is not trivial to implement reliably and it tends to be inefficient due to a TCP handshake and HTTP header overhead. The Websocket Protocol attempts to solve these problems without compromising security.

A websocket connection is established by a client sending a websocket handshake request in the form of, for example, a clear-text request, a server replies with a websocket handshake response, and the connection is upgraded to a websocket connection. A websocket connection can be designed to work, for example, over HTTP ports (e.g., 80 and 443), as well as to support HTTP proxies and intermediaries. The Websocket protocol is part of the HTML 5 standard, which is the first official communication pathway to utilize the standard HTTP upgrade mechanism. A feature of the websocket protocol is that the protocol requires a raw byte buffer to be transmitted, as opposed to HTTP requests and responses with a well-defined structure. Thus, a received message must be converted to raw data, or another appropriate format, before being transmitted over a websocket connection.

In general, the term "socket" as used herein refers to an endpoint of a bidirectional communication flow across an Internet Protocol-based computer network, such as the internet, and a socket connection refers to such a communication flow. With an Internet socket, an application programming interface (API) for the TCP/IP protocol stack is provided, usually by the operating system, as a mechanism for delivering incoming data packets to an appropriate application process based on a combination of local and remote IP addresses and port numbers. Each socket can be mapped by the operating system to a communicating application process. A socket address in one example includes the combination of an IP address, which provides the location of a computing device, and a port, which is mapped to the application program process. A websocket is a technology providing for bi-directional, full-duplex communications channels over a single TCP socket, and though originally designed to be implemented in web browsers and web servers, can be used by any client or server application.

In various embodiments, a standard HTTP request is made by an application running on a source device to a destination over a network. Before the HTTP request is sent, however, the HTTP request is intercepted by a software module that converts the HTTP request to a binary (or other) request independent of the application. The binary request is subsequently sent over a websocket connection to the destination. The destination, such as an application server, is configured with a similar software module that converts the binary request back to the standard HTTP request and forwards the HTTP request to a destination application. This technique can be used for a variety of web applications, such as games, stock tickers, multiuser applications with simultaneous editing, user interfaces exposing server-side services in real time, and the like.

Various other applications, processes and uses are presented below with respect to the various embodiments.

FIG. 1 illustrates an example component level workflow diagram 100 illustrating an example set of components that can be utilized in accordance with various embodiments. In this example, a source computing device 110 (e.g., a client, server, or other such device) is configured to send a request message to a webserver 130 (or other such device or endpoint) across at least one network 130, such as the Internet or a cellular network. The source computing device 110 can have a least one application 112 stored to, and/or executing on, the client device 110. The application and/or device can utilize a communication manager 122, or other such module, component, or service, to request a connection to an endpoint, such as the webserver 140 through a communication layer 120. As part of establishing the connection, the communication manager 122 can establish, define, and/or implement various connection parameters and policies regarding the connection's use. After the connection is established, the communication manager 122 can provide the connection to the application 112 for the application to use directly. The application 112 in at least some embodiments is responsible for defining semantics associated with each message, and the connection is the interface that facilitates the functions of sending and receiving the messages.

As mentioned above, the application can generate and submit requests, such as conventional HTTP requests, that can be forwarded to an appropriate endpoint, such as the webserver 140. The connection manager, however, can have the option of intercepting the requests and converting those requests to another form for transmission. In at least some embodiments, the connection manager can determine whether to instead send that request over a websocket connection. The connection manager can convert the message to plain text, binary data, or a raw byte form, among others, and can cause the converted information to be sent over a websocket connection through a network 130. The connection manager, in accordance with various embodiments, can include an HTTP request/response converter that converts HTTP requests and responses to a form that is passable over the websocket independently of the application 112. Since application developers might utilize HTTP as the standard request/response protocol, the application 112 can send a request with an HTTP based implementation and pass it off to the connection layer as a standard HTTP request. The HTTP request can then be sent over a standard HTTP connection, a new HTTP connection can be established and immediately upgraded to a websocket connection, or the request could be sent over an existing websocket connection. If the connection is upgraded to a websocket connection, the contents of the message are converted to a form that is passable over the websocket connection. In one example, the HTTP request/response converter converts the HTTP message to an appropriate format, which includes various standard HTTP parameters, such as the intended audience, method (get, post, put, delete), URL, domain, and the like, and encapsulates these parameters in a form, such as a plain text or other binary or raw byte forms, and sends the request over the websocket connection. As discussed elsewhere herein, a connection manager can utilize various criteria to determine whether to use a websocket connection, such as whether a bidirectional websocket connection exists, a frequency of requests, a rate or number of requests, and the like. A connection manager can also base the determination on whether the target endpoint has a converter operable to convert a websocket message to a conventional format corresponding to the original message.

Figure 2:
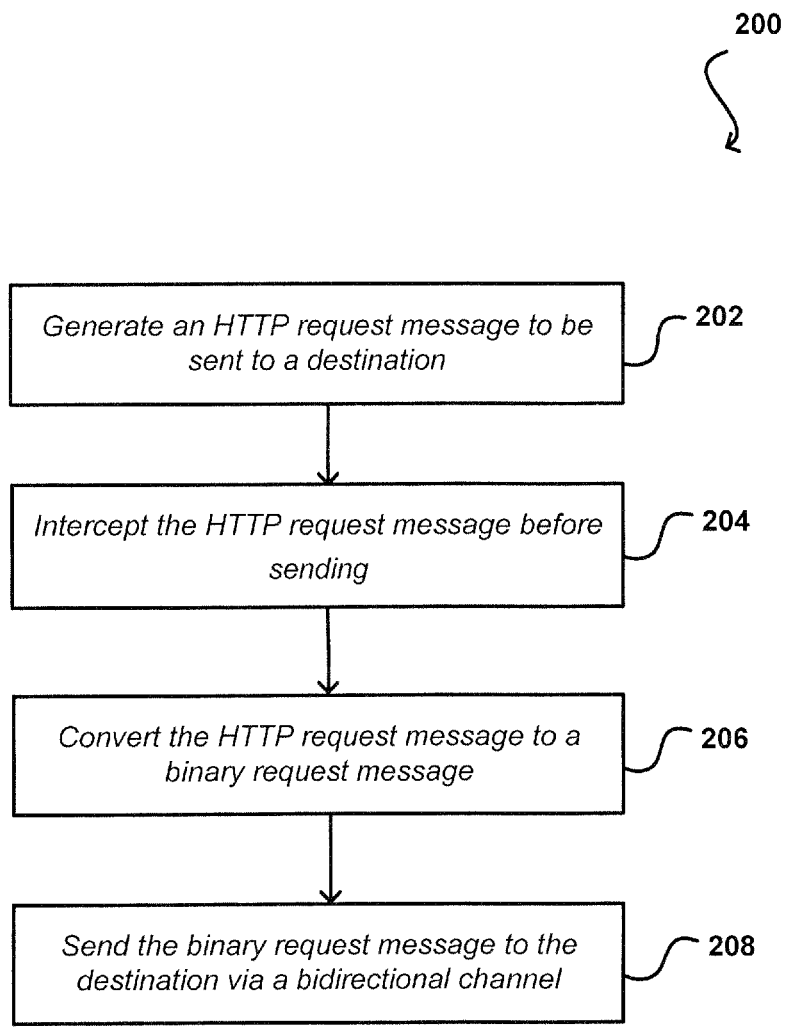
FIG. 2 illustrates an example process for sending a request message by a requesting device, in accordance with various embodiments.

FIG. 2 illustrates an example process 200 for sending an HTTP request in accordance with various embodiments. It should be understood that, for any process discussed herein, there can be additional, fewer, or alternative steps performed in similar or alternative orders, or in parallel, within the scope of the various embodiments unless otherwise stated. In this example, an HTTP request message is generated 202. The request message, for example, could be generated by an application running on a client computing device whose intended recipient is a webserver. After the request is generated, it is forwarded to a connection layer for transmission. In this example, however, the HTTP request message is intercepted by an HTTP request/response converter 204 before it is transmitted to an intended recipient. The HTTP request/response converter converts the HTTP request message to a binary request message 206, so that the request is passable over a websocket connection. The binary request message contains within it an encoded request, such as the encoded HTTP request. The specific encoding used is immaterial, as it could be a compact binary representation of the HTTP request or it could be an inefficient string representation of the HTTP request. The representation is termed 'binary' only to underscore that the next layer in the system treats it as an opaque collection of binary data to be transmitted via a protocol, such as the WebSockets Protocol, that accepts a byte buffer. In this example, the binary request message is sent to the intended recipient, such as a webserver, via a websocket 208. The intended recipient is configured to convert the binary request and forward the request as an HTTP request to a destination application.

Figure 3:
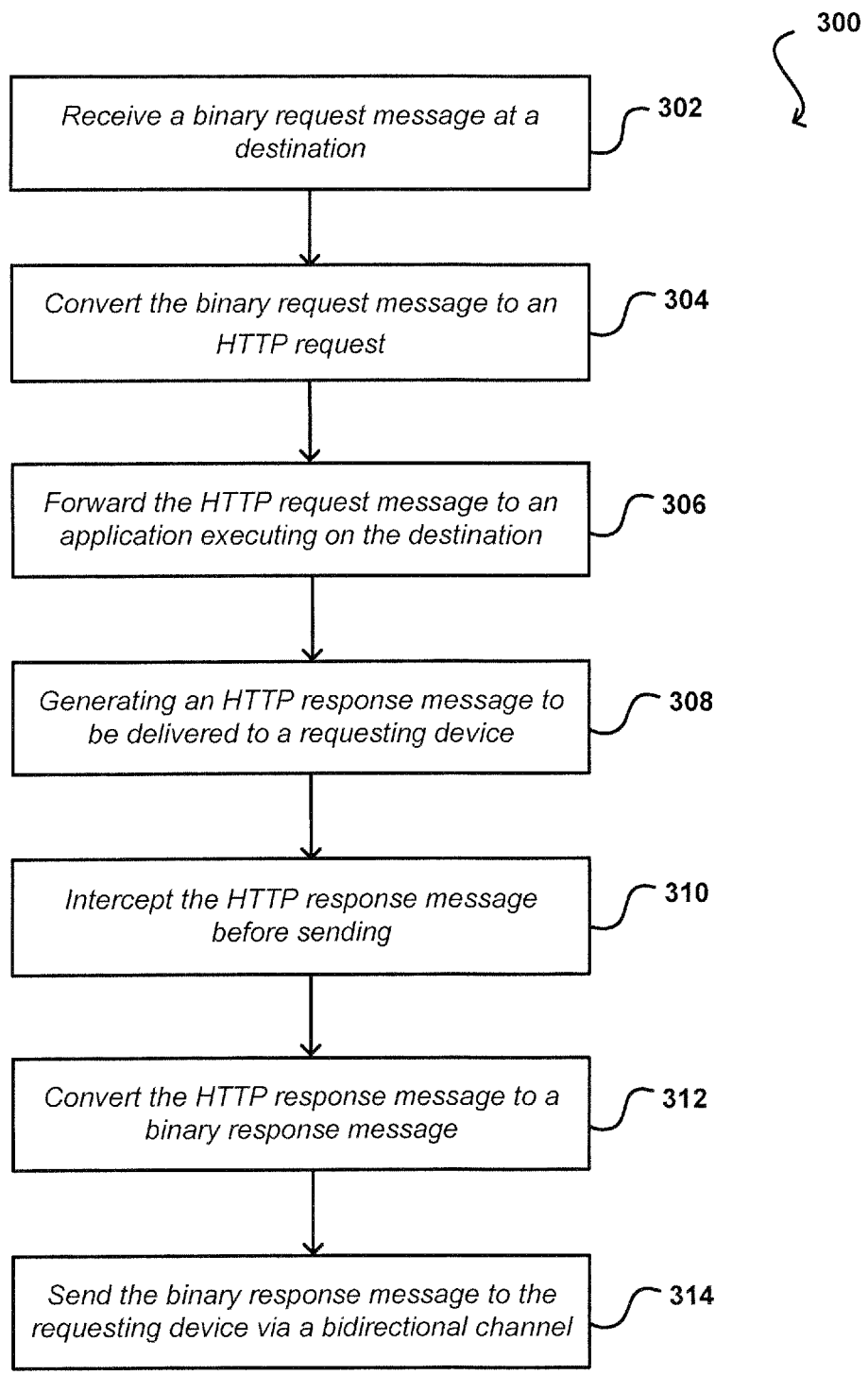
FIG. 3 illustrates an example process for receiving a request message and sending a response by a destination device, in accordance with various embodiments.

FIG. 3 illustrates an example process 300 for receiving a binary request message over a websocket connection, in accordance with various embodiments. In this example, a binary request is received 302 at a destination device, such as a server. Before the binary request reaches a destination application, the binary request is intercepted or stopped on its way to the destination application and converted from binary to a standard HTTP request by an HTTP request/response converter of the destination device 304. In this example, after the request has been converted, the HTTP request is forwarded to the destination application 306. In one embodiment, the destination application is the same application that would have processed the request had the request been a standard HTTP request. In response, the destination application generates an HTTP response message 308, in this example, to be sent back to the requesting computing device. As the destination application sends the HTTP response, the response is intercepted prior to leaving the destination and being sent to the requesting device 310. In this example, the HTTP response is converted from the standard HTTP response message to a binary response message by the HTTP request/response converter after being intercepted and prior to transmission 312. In various embodiments, multiple requests/responses can be simultaneously passed back and forth and/or multiplexed over the same websocket connection by multiple applications. Thus, it is advantageous to map the response, in this example, to the requesting application prior to forwarding the response. Once the response has been converted into a form that is passable back over the websocket connection, the binary response is sent over a network to the requesting device 314.

Figure 4:
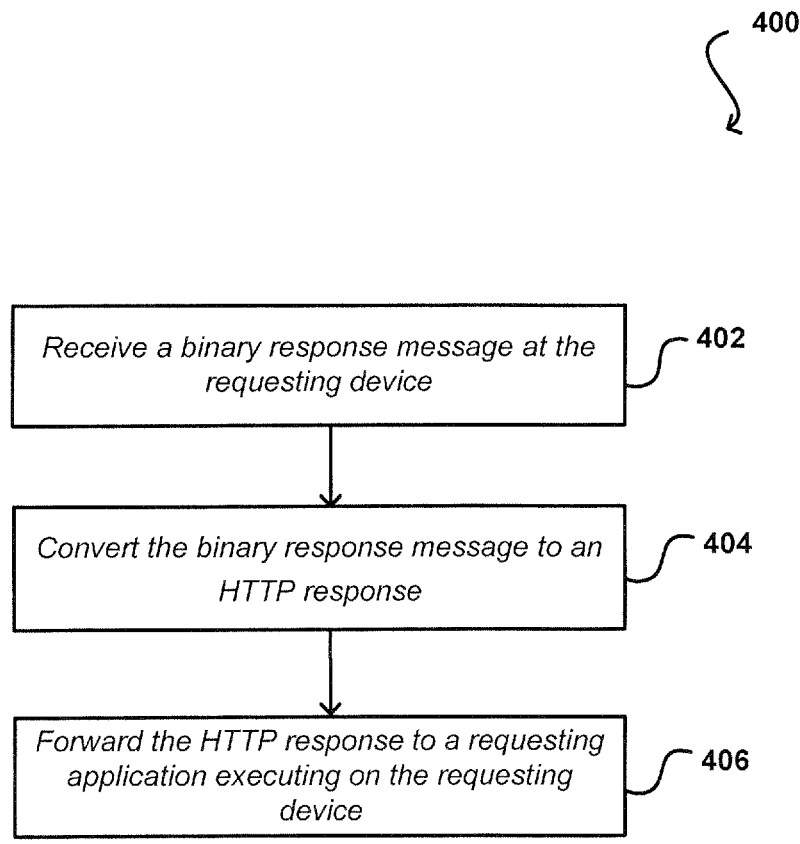
FIG. 4 illustrates an example process for receiving a response message by a requesting device, in accordance with various embodiments.

FIG. 4 illustrates an example process 400 for receiving a binary response message over a websocket connection by the requesting device, in accordance with various embodiments. In this example, a binary response from the destination device is received 402 by the requesting device, such as a portable computing device, for example. Before the binary response reaches the application that made the original request, the binary response is intercepted or identified on its way to the requesting application and converted from a binary representation to a standard HTTP response by the HTTP request/response converter of the requesting device 404. In this example, after the request has been converted, the HTTP response is forwarded to the requesting application 406.

Figure 5:
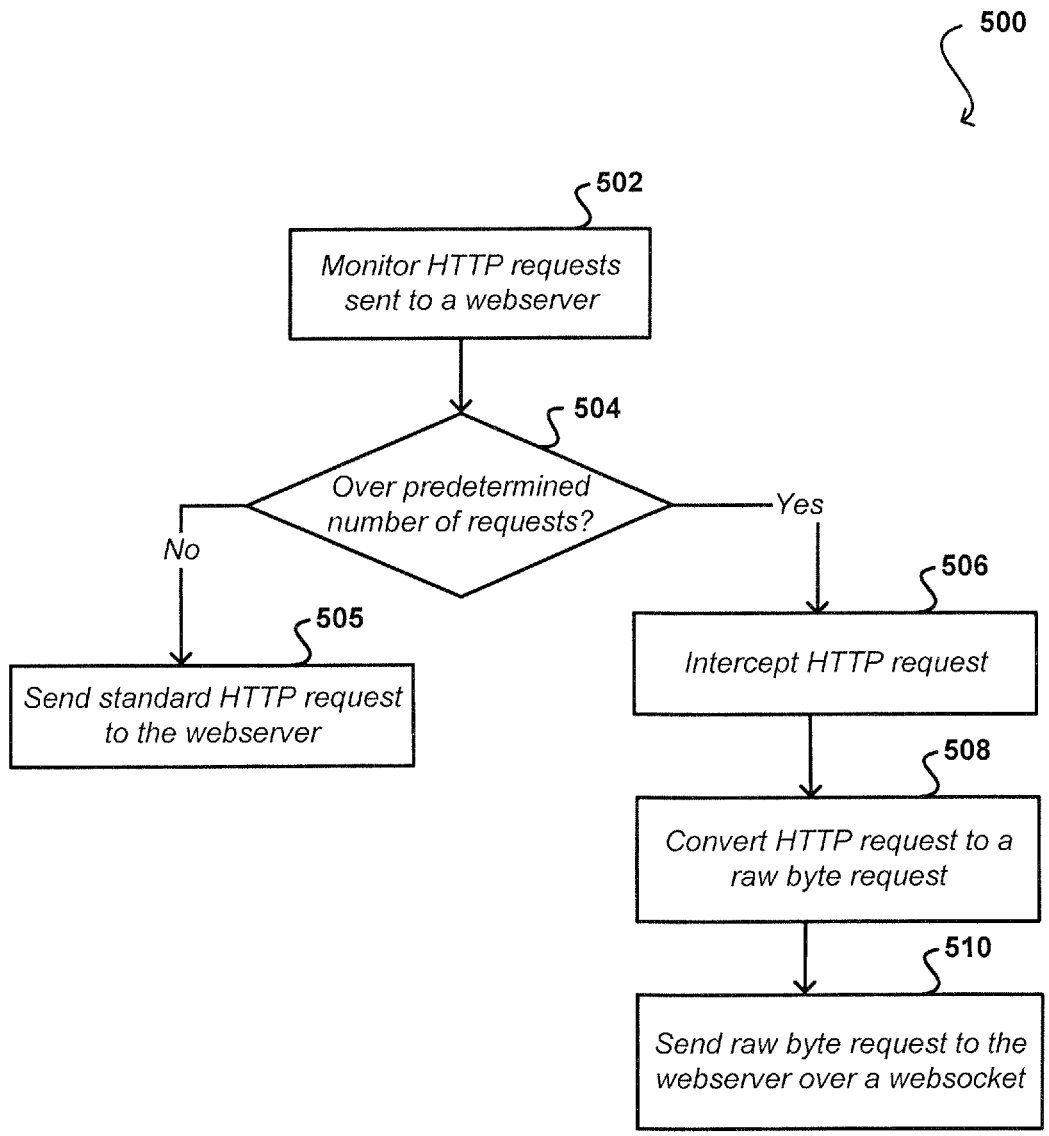
FIG. 5 illustrates another example process for sending a request message by a requesting device, in accordance with various embodiments.

FIG. 5 illustrates an example process 500 for sending request messages over a standard HTTP connection and a websocket connection, in accordance with various embodiments. As mentioned above, it should be understood that, for any process discussed herein, there can be additional, fewer, or alternative steps performed in similar or alternative orders, or in parallel, within the scope of the various embodiments unless otherwise stated. In this example, standard HTTP requests to be delivered to a webserver from an application running on a source device are monitored 502. In this example, based at least in part on exceeding a predetermined number of messages (e.g., request or response) or when an amount of data sent exceeds a threshold in a specified period of time that is deemed to no longer be efficient to send request messages over a standard HTTP connection 504, identify subsequent HTTP requests by a conversion module of the source device 506. The conversion module is configured to convert HTTP request and response messages into binary request and response messages and vice versa. In this example, if the predetermined number of request/response messages being sent or the amount of data transmitted is below the predetermined threshold, the request messages continue to be sent over a standard HTTP connection 505. In this example, the subsequent HTTP requests are converted to one or more raw byte or binary request messages 508. After being converted, the one or more raw byte or binary request messages are sent to the webserver over a websocket connection 510. Depending on various circumstances, such as data traffic, a number of messages transmitted over a period of time, a frequency of messages received, particular knowledge of a system's state, the availability of an already established websocket connection, and the like, the system, conversion module, or connection manager may choose to send subsequent HTTP messages over a websocket connection.

Certain examples discussed herein assume that a bidirectional websocket connection already exists between the relevant endpoints. This will not always be the case. If a websocket connection does not already exist, a connection manager might select to transmit the request over standard HTTP. The requests being transmitted can be monitored, and based on factors such as system state and number or frequency of requests, the connection manager can determine whether to initiate and/or upgrade to a bidirectional websocket connection.

In one embodiment, a standard HTTP connection between two endpoints is upgraded to a websocket connection using the HTTP "upgrade" header. Once established, the websocket connection can allow either endpoint to send data to the other. Unlike a standard HTTP request, however, no protocol-level response is defined once the upgrade request is processed. Applications communicating using websocket connections in at least some embodiments must define their own rules for acknowledging and responding to messages. The data being sent can be one of two types: an ASCII string, or a buffer of arbitrary bytes. The protocol does not define any structure to the data being transmitted.

Figure 6:
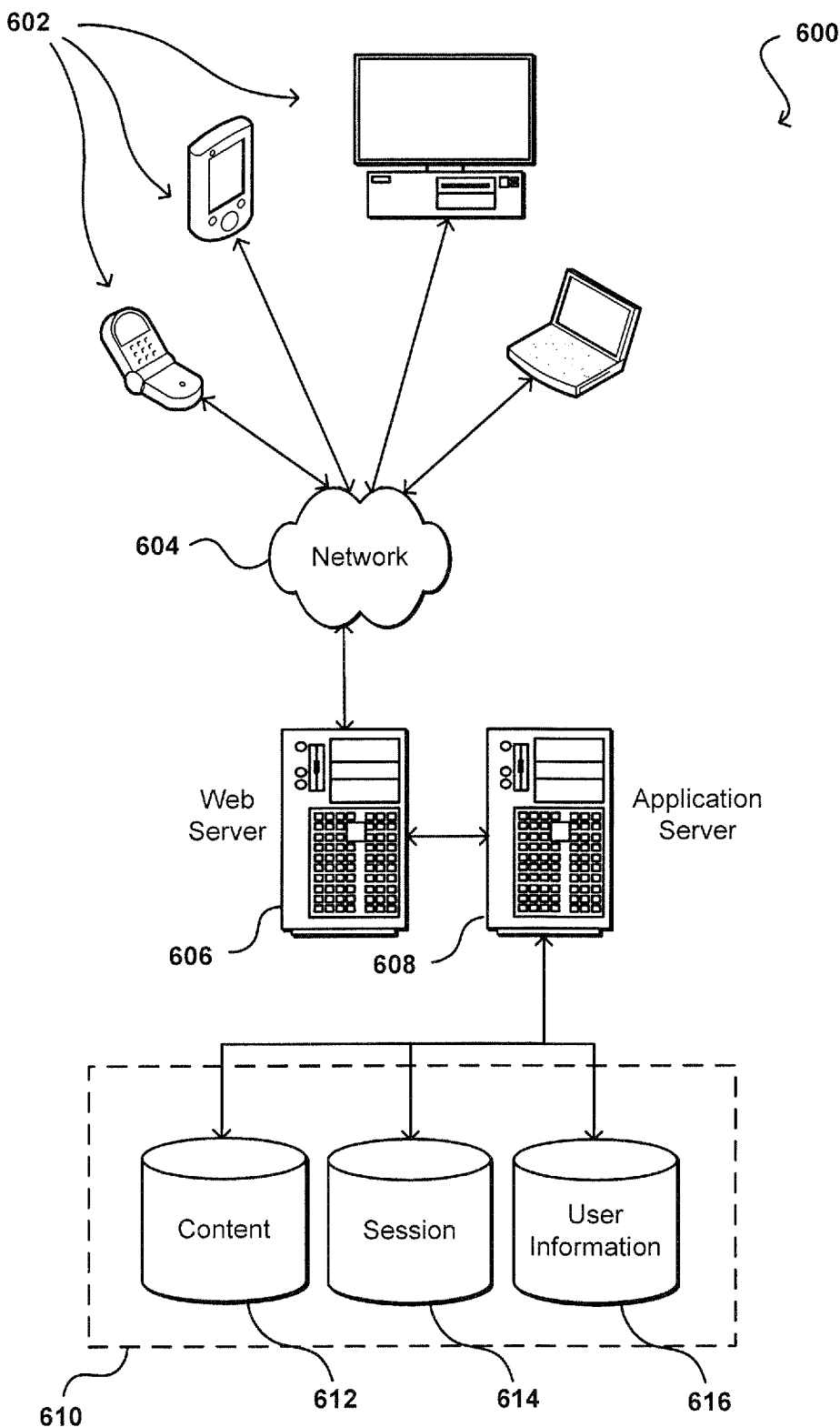
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIPS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
identifying, on a computing device, a hypertext transfer protocol (HTTP) request sent by an application to be delivered to a destination over an HTTP connection;
determining, by a connection manager, to use a websocket connection based at least in part upon at least one of a number or a frequency of messages transmitted over a period of time;
establishing the websocket connection between the application and the destination, the websocket connection providing a bi-directional, full-duplex communications channel;
encoding the HTTP request;
encapsulating the encoded HTTP request in a binary request;
transmitting the binary request over the websocket connection;
receiving a binary response over the websocket connection to the computing device;
converting the binary response to an HTTP response; and
forwarding the HTTP response to the application.

2. The computer-implemented method of claim 1, further comprising:
determining, by the connection manager, whether a bidirectional websocket connection exists to the destination and is available for communication.

3. The computer-implemented method of claim 1, wherein converting the HTTP request to the binary request and transmitting the binary request over the websocket connection is performed by a component separate from the application.

4. The computer-implemented method of claim 1, wherein content of the binary request comprises an ASCII string or a buffer of arbitrary bytes.

5. The computer-implemented method of claim 1, wherein the websocket connection is established prior to identifying the HTTP request.

6. A computer-implemented method, comprising:
identifying a message of a plurality of messages to be delivered to a destination, the message being formatted according to a first transfer protocol;
determining a connection type for the message to the destination, wherein the connection type is determined based at least in part upon at least one of a number or a frequency of the plurality of messages transmitted over a period of time;
sending the message over a first connection for the first transfer protocol when the message is to be transferred using the first transfer protocol;
establishing a websocket connection between an application and the destination, the websocket connection providing a bi-directional, full-duplex communications channel;
encoding the message;
encapsulating the encoded message in a binary format message; and
transmitting the binary format message over the websocket connection when the message is to be transferred using a second transfer protocol.

7. The computer-implemented method of claim 6, wherein the connection type is further determined based at least in part upon knowledge of system state, or an amount of data transferred over a period of time.

8. The computer-implemented method of claim 6, further comprising:
receiving a binary response over the websocket connection;
converting the binary response to a response formatted for the first transfer protocol; and
sending the response to a source of the message.

9. The computer-implemented method of claim 8, wherein the binary response is mapped to the source of the message by the destination.

10. The computer-implemented method of claim 6, wherein the websocket connection is established prior to identifying the message.

11. The computer-implemented method of claim 6, wherein the first transfer protocol is a hypertext transfer protocol (HTTP).

12. The computer-implemented method of claim 6, wherein the websocket connection is configured to accommodate messages from additional applications simultaneously.

13. The computer-implemented method of claim 6, wherein when the message is transferred using the second transfer protocol, the connection type is upgraded from the first connection to the websocket connection using an upgrade header of the message.

14. A computer-implemented method, comprising:
under the control of one or more computer systems configured with executable instructions,
determining to use a websocket connection based at least in part upon at least one of a number or a frequency of messages transmitted over a period of time;
encode a hypertext transfer protocol (HTTP) request;
encapsulate the encoded HTTP request in a binary request
identifying the binary request sent to an endpoint over the websocket connection, the websocket connection providing a bi-directional, full-duplex communications channel;
converting the binary request to the hypertext transfer protocol (HTTP) request; and
forwarding the HTTP request to the endpoint.

15. The computer-implemented method of claim 14, wherein the binary request is converted to the HTTP request by a conversion module that is separate from the endpoint.

16. The computer-implemented method of claim 15, wherein the endpoint corresponds to an application executing on a computing device, and wherein the conversion module executes on the computing device independent of the application.

17. The computer-implemented method of claim 14, further comprising:
identifying an HTTP response generated by the endpoint;
converting the HTTP response to a binary response; and
forwarding the binary response to a requesting source over the websocket connection.

18. A computing system, comprising:
at least one processor; and
memory including instructions that, when executed by the at least one processor, cause the computing system to:
identify a message sent to a destination, the message being formatted according to a first transfer protocol;
encode the message;
encapsulate the encoded message in a binary request;
determine to use a websocket connection based at least in part upon at least one of a number or a frequency of messages transmitted over a period of time; and transmit the binary request over the websocket connection associated with the destination, the websocket connection providing a bi-directional, full-duplex communications channel.

19. The computing system of claim 18, further comprising:
a communication management module configured to establish the websocket connection before identifying the message.

20. The computing system of claim 18, wherein the instructions when executed further cause the computing system to:
receive a binary response from the destination over the websocket connection;
convert the binary response to a response formatted for the first transfer protocol; and
send the response formatted for the first transfer protocol to a source of the message.

21. A non-transitory computer-readable storage medium storing instructions that, when executed by at least one processor of a computing system, cause the computing system to:
identify a hypertext transfer protocol (HTTP) request sent to an endpoint;
encode the HTTP request;
encapsulate the encoded HTTP request in a binary request;
determine to use a websocket connection based at least in part upon at least one of a number or a frequency of messages transmitted over a period of time; and
forward the binary request to the endpoint over the websocket connection, the websocket connection providing a bi-directional, full-duplex communications channel.

22. The non-transitory computer-readable storage medium of claim 21, wherein the HTTP request is converted to the binary request by a conversion module that is separate from an application sending the HTTP request.

23. The non-transitory computer-readable storage medium of claim 21, wherein the endpoint corresponds to an application executing on a computing device, and wherein a conversion module on the computing device is configured to convert the binary request to the HTTP request, and wherein the conversion is performed by the conversion module separate from the application executing on the computing device.

24. The non-transitory computer-readable storage medium of claim 21, wherein the instructions when executed further cause the computing system to:
receive a binary response from the endpoint over the websocket connection;
convert the binary response to an HTTP response; and
send the HTTP response to a source of a message.

* * * * *